United States Patent
Cox et al.

(10) Patent No.: US 12,283,054 B2
(45) Date of Patent: Apr. 22, 2025

(54) PLACING APPLICATION WINDOWS TO AVOID OBSCURING EXISTING DISPLAYED COMPONENTS

(71) Applicant: INTERNATIONAL BUSINESS MACHINES CORPORATION, Armonk, NY (US)

(72) Inventors: Benjamin David Cox, Newbury (GB); Joseph Sayer, Bury St Edmunds (GB); Andrew David Lyell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 18/054,158

(22) Filed: Nov. 10, 2022

(65) Prior Publication Data

US 2024/0161306 A1    May 16, 2024

(51) Int. Cl.
G06T 7/13 (2017.01)
G06T 7/73 (2017.01)
G06V 10/25 (2022.01)

(52) U.S. Cl.
CPC .......... *G06T 7/13* (2017.01); *G06T 7/75* (2017.01); *G06V 10/25* (2022.01); *G06T 2200/24* (2013.01)

(58) Field of Classification Search
CPC ......... G06T 7/13; G06T 7/75; G06T 2200/24; G06V 10/25
USPC ........................................................ 715/764
See application file for complete search history.

(56) References Cited

U.S. PATENT DOCUMENTS

| | | | |
|---|---|---|---|
| 10,254,942 B2 | 4/2019 | Vranjes | |
| 11,036,344 B1 | 6/2021 | Portelli | |
| 11,385,775 B2 | 7/2022 | Singh | |
| 2016/0034155 A1* | 2/2016 | Vranjes | G06F 3/0481 715/803 |
| 2018/0137534 A1* | 5/2018 | Goodhart | G06Q 30/0244 |
| 2018/0239521 A1* | 8/2018 | Bastide | G06F 3/0481 |
| 2019/0228057 A1* | 7/2019 | Feltham | G06F 40/12 |

FOREIGN PATENT DOCUMENTS

WO     2017113551 A1    7/2017

OTHER PUBLICATIONS

Saigal, "The 6 Best Mac Window Management Tools," MUO, Jul. 22, 2022, https://www.makeuseof.com/tag/best-mac-window-management-tools/, 21 pages.

* cited by examiner

*Primary Examiner* — Mohammed H Zuberi
*Assistant Examiner* — Ahamed I Nazar
(74) *Attorney, Agent, or Firm* — Anthony M. Pallone

(57) ABSTRACT

According to one embodiment, a method, computer system, and computer program product for placing an application window is provided. The embodiment may include receiving a window opening event for the application window. In response to determining that the application window can be repositioned and resized, the embodiment may include identifying one or more active areas of a computing device screen. An active area is an area of the computing device screen which is currently displaying one or more other windows and their respective interactive elements. The embodiment may include utilizing one or more search algorithms to identify a least active area of the one or more active areas of the computing device screen. The embodiment may include displaying the application window within the least active area.

17 Claims, 2 Drawing Sheets

PLACING APPLICATION WINDOWS TO AVOID OBSCURING EXISTING DISPLAYED COMPONENTS

BACKGROUND

The present invention relates generally to the field of computing, and more particularly to application window management.

In computing, a window is a graphical control element. It occupies a certain portion of a screen and consists of a visual area displaying some of the graphical user interface (GUI) (e.g., content of an application for a user to view and interact with) of the application it belongs to and is usually framed by a window decoration. A window is usually a rectangular area that can be resized and is generally editable according to the capabilities and limitations imposed on it by the application providing it. Further, the area of a window can overlap with the areas of other windows. The window is essential in facilitating multitasking in a modern operating system as it allows users to visually and manually switch between running applications and make general interactions with the operating system. Application window management software is a utility found in most GUI-based software and applications that manages the overall alignment and layout of graphical windows. Such software may also control the placement and appearance of application interface windows.

SUMMARY

According to one embodiment, a method, computer system, and computer program product for placing an application window is provided. The embodiment may include receiving a window opening event for the application window. In response to determining that the application window can be repositioned and resized, the embodiment may include identifying one or more active areas of a computing device screen. An active area is an area of the computing device screen which is currently displaying one or more other windows and their respective interactive elements. The embodiment may include utilizing one or more search algorithms to identify a least active area of the one or more active areas of the computing device screen. The embodiment may include displaying the application window within the least active area.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
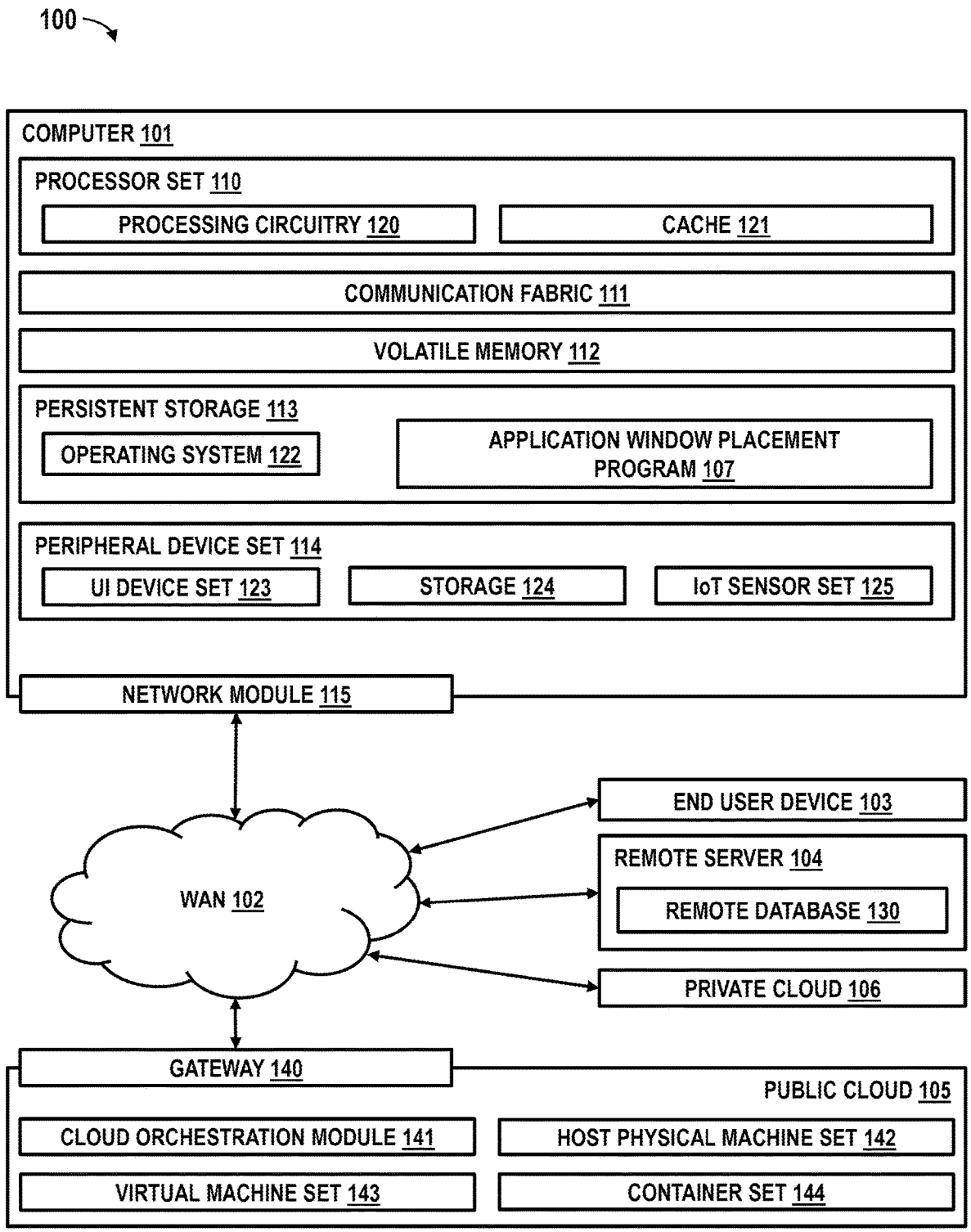
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to application window management. The following described exemplary embodiments provide a system, method, and program product to, among other things, display an application window in a manner which avoids obscuring one or more elements of other displayed windows. Therefore, the present embodiment has the capacity to improve the technical field of application window management by dynamically identifying one or more active areas of a computing device screen, and configuring placement and size of a new application window so as not to obscure one or more elements of the identified active areas, thus improving the placement of application windows when working on a computing device by minimizing the risk of a new application window being displayed in an area of a screen which could be inconvenient (e.g., obscuring view or controls of other displayed windows) to a user.

As previously described, an application window is a graphical control element. It occupies a certain portion of a screen and consists of a visual area displaying some of the graphical user interface (GUI) components (e.g., content of an application for a user to view and interact with) of the application it belongs to and is usually framed by a window decoration. A window is usually a rectangular area that can be resized and is generally editable according to the capabilities and limitations imposed on it by the application providing it. Further, the area of a window may overlap with the areas of other windows. The window is essential in facilitating multitasking in a modern operating system as it allows users to visually and manually switch between running applications and make general interactions with the operating system. Application window management software is a utility found in most GUI-based software and applications that manages the overall alignment and layout of graphical windows. Such software may also control the placement and appearance of application interface windows.

Furthermore, when working with software applications, it is common for a user, or an application itself, to open new windows which will present new applications, user interface (UI) controls, modal windows, or other application functions. For the purpose of this disclosure the term "windows" refers to application windows, overlay panels, modals, control panels, and other UI controls that are displayed, and sometimes overlay each other, on screen. The existing state is that these windows will appear somewhere on the computing device screen, typically with their placement and size being chosen by a controlling application or based upon previous times the window has been opened. Depending on the task at hand, the location and size of these windows may be distracting to the user and disadvantageous to the user's workflow. For example, if a new window were displayed in an area of the screen with one or more existing (i.e., already displayed) application windows, such as over the tabs or UI controls of an internee browser window, the user would be forced to move or rescale the new window to better suit their workflow. It may therefore be imperative to have a system in place to dynamically place and size a new application window so as not to cover one or more elements of an active area of a user's computing device screen (i.e., an area of the screen with one or more already displayed windows). Thus, embodiments of the present invention may be advantageous to, among other things, map/identify busy (i.e., active) areas of a computing device screen, map/identify interactive elements of displayed windows, receive/intercept a new window opening event, resize a new window where possible, and utilize search algorithms (e.g., search-based numerical methods or discrete mathematics such as a brute force search) to position and place a new window in a least busy area of a computing device screen (e.g., an area of the screen where there are fewer UI controls of other windows or an area of the screen not currently being used to display a window) or to position and place a new window so as to minimize concealing view or interactive elements of already existing windows. The present invention does not require that all advantages need to be incorporated into every embodiment of the invention.

According to at least one embodiment, a window opening event for a new window to be displayed on a screen may be received from an operating system or an application. Based on information associated with the window opening event, a determination may be made as to whether changes may be made to attributes of the new window. Window attributes may include its positioning and sizing. In response to determining that attributes of the new window may be changed, a heat map, or a busyness/activity map, of current windows displayed on the screen, and their respective interaction elements, may be created. The heat map may be indicative of busy or active areas of the screen, with "hot" areas having a high busyness or activity value. According to at least one embodiment, creation of the heat map may be based on a component tree determination of the current windows displayed on the screen and their respective interaction elements. According to at least one other embodiment, creation of the heat map may be based on edge detection of the current windows displayed on the screen and their respective interaction elements. Search algorithms may be used to evaluate the created heat map and identify a least busy or least active area of the screen. The new window may be placed in the identified least busy or least active area of the screen.

According to at least one other embodiment, as a user may switch between windows as part of their workflow, obscured windows (e.g., windows partially or completely hidden behind another window) and minimized windows, and their respective interaction elements, may also be taken into consideration when creating the heat map. Component tree or edge detection methods may be used to generate the heat maps of busyness of screen areas for all windows including obscured and minimized windows. The heat maps may be combined into a single heat map, potentially weighting heat maps of topmost windows more heavily as compared to heat maps of bottommost or minimized windows because of the topmost windows' greater likelihood of being accessed by the user. Using the combined heat map data, search algorithms may be used to find a display location for the new window, bearing in mind any other constraints on its position.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to detect one or more busy areas of a computing screen and, accordingly, identify a display location of the computing screen for a new window such that placement of the new window minimizes obscuring the one or more busy areas.

Referring to FIG. 1, an exemplary computing environment 100 is depicted, according to at least one embodiment. Computing environment 100 contains an example of an environment for the execution of at least some of the computer code involved in performing the inventive methods, such as application window placement (AWP) program 107. In addition to AWP program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AWP program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in AWP program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in AWP program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, EUD 103 may additionally be a wireless charger device now known or to be developed in the future that is capable of transmitting power wirelessly to one or more power-consuming electric devices in accordance with any government regulations regarding wireless power output. For example, EUD 103 may be any known IR wireless charger that transmits power to computer 101 wirelessly through power beaming or beam-formed signals. As another example, EUD 103 may be any known RF wireless charger capable of providing radiated energy to computer 101. Although depicted as a single device, computing environment 100 may include a plurality of EUDs 103.

The AWP program 107 may be a program capable of receiving a window opening event and associated information (e.g., attributes of the window), capturing or receiving a print screen image (i.e., a screenshot) of a computing device screen, identifying component tree structures of existing windows of a computing device screen and their respective interactive elements, identifying one or more active or busy areas of a computing device screen based on a captured print screen image or identified component tree structures, creating one or more heat maps of a computing device screen based on identified active or busy areas, determining whether a to-be-placed window may be resized and/or repositioned, and repositioning and/or resizing a to-be-placed window such that its placement (i.e., its display) is within a least busy or active area of a computing device screen. In at least one embodiment, AWP program 107 may require a user to opt-in to system usage upon opening or installation of AWP program 107. In at least one embodiment, AWP program 107 may be integrated within logic of a specific software application stored within persistent storage 113. Alternatively, AWP program 107 may be part of an operating system (e.g., operating system 122) and either provide default window placement when the specific application does not do so or override specific application's suggested window placement. Notwithstanding depiction in computer 101, AWP program 107 may be stored in and/or executed by, individually or in any combination, end user device 103, remote server 104, public cloud 105, and private cloud 106 so that functionality may be separated among the devices. The application window placement method is explained in further detail below with respect to FIG. 2.

Figure 2:
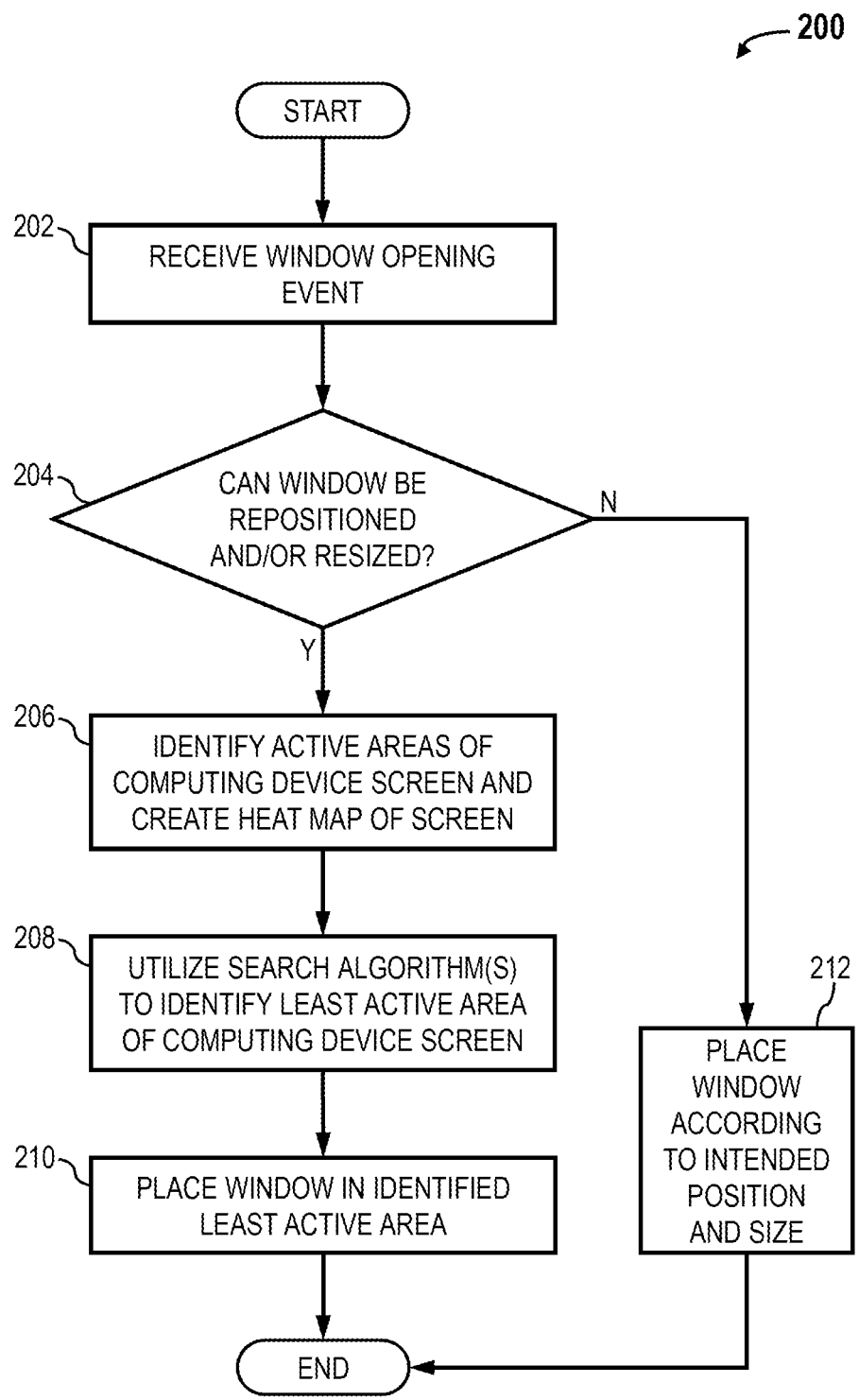
FIG. 2 illustrates an operational flowchart for identifying a display location of a screen for a to-be-displayed application window via an application window placement process according to at least one embodiment.

Referring now to FIG. 2, an operational flowchart for identifying a display location of a screen for a to-be-displayed application window via an application window placement process 200 is depicted according to at least one embodiment. At 202, AWP program 107 receives or intercepts a window opening event for an application window to-be-displayed on a screen of a computing device (e.g., computer 101). Further, AWP program 107 may also receive attribute information associated with the application window. The associated attribute information may include the following information of the application window: identifying information (e.g., an owning or instantiating program), an intended screen placement (e.g., default display location), intended dimensions (e.g., pixel height and width), an indication of position and dimension editability (e.g., whether or not intended screen placement and/or dimensions may be changed), and component information (e.g., controls or interactive elements). The window opening event for the application window and its associated attribute information may be received from an operating system (e.g., operating system 122) of the computing device. For instance, a windowing system or window manager of the operating system may provide AWP program 107 with the window opening event notification for the application window and its associated attribute information. Alternatively, AWP program 107 may receive the window opening event for the application window and its associated attribute information from an owning program of the window (i.e., the program instantiating the window).

Next, at 204, AWP program 107 determines whether the window may be repositioned and/or resized. In making this determination, AWP program 107 may reference the received attribute information of the window to determine if an indication of position and dimension editability is present. Some application windows may be limited, either by an operating system or by an owning application, as to their ability to be repositioned or resized. In response to determining that the window may be repositioned and/or resized (step 204, "Y" branch), the application window placement process 200 may proceed to step 206. In response to determining that the window may not be repositioned and/or resized (step 204, "N" branch), the application window placement process 200 may proceed to step 212. According to at least one embodiment, where it has been determined that the window may not be repositioned and/or resized, AWP program 107 may override a fixed position and size of the window and the application window placement process 200 may proceed to step 206.

At 206, AWP program 107 identifies one or more active areas (i.e., busy areas) of the computing device screen. An active area may be an area of the screen which is currently being used to display another window and its interactive elements (e.g., UI controls). Areas of the screen which are more densely populated with existing windows, and their respective interactive elements, may be considered more active than other areas of the screen which are less populated (i.e., less used) by existing windows, and their respective interactive elements. According to at least one embodiment, AWP program 107 may identify one or more active areas of the screen via a component tree analysis of existing visible windows and their respective interactive elements. Such analysis may be appropriate when existing content (e.g., windows) of the screen can be retrieved, by AWP program 107, as a tree, or other data structure, of components and subcomponents with an awareness of their respective on-screen positioning. In the case of existing internet browser-based windows of the screen, AWP program 107 may retrieve respective component and subcomponent information from a backing data structure such as a document object model (DOM) tree which may be visualized via a page source or inspect element view of such windows. In the case of existing non-internet browser-based or computing device native windows (e.g., windows of a local application) of the screen, AWP program 107 may retrieve respective component and subcomponent information from a windowing system or window manager of the operating system. Using the retrieved component and subcomponent information of all on-screen windows (i.e., components) and their interactive elements (i.e., subcomponents), AWP program 107 may compile a list of their respective bounding boxes (or other more relevant component and subcomponent pixel coordinates if the bounding box does not accurately represent what is viewed on-screen). Optionally, AWP program 107 may count 'leaf' components in tree-style data structures since they are most likely to be the visible components rather than invisible layout and grouping containers.

According to at least one other embodiment, AWP program 107 may identify one or more active areas of the screen via an edge detection analysis of existing visible windows and their respective interactive elements. Such analysis may be appropriate when existing content of the screen can be retrieved, by AWP program 107, as an image, such as in a raster format (e.g., a print screen image). AWP program 107 may capture, or receive, a current layout of the screen in a raster or other image-style format (e.g., a JPG or PNG) and utilize known methods of edge detection on the screen layout image to identify distinct edges of visible windows within the screen.

Also at 206, AWP program 107 creates a heat map representation of identified active areas of the screen. The created heat map may include heat values (e.g., normalized values on a scale of zero to one or some other value scale) which are associated with identified active areas; the higher the heat value of an area, the more activity (i.e., existing windows and their respective elements) in that area. According to at least one embodiment, creation of the heat map may be based on the compiled list of component coordinates. Hot areas (i.e., areas with a high heat value) may be areas of the screen which are more densely populated with existing windows, and their respective interactive elements (i.e., areas of the screen where there are more components and subcomponents placed). For example, a number of component boundaries within a radius of a particular pixel, or set of pixels, may correlate to a heat value within the radius. According to at least one other embodiment, creation of the heat map may be based on output from a utilized edge detection method. For instance, a number of detected edges within a radius of a particular pixel, or set of pixels, may correlate to a heat value within the radius. Hot areas (i.e., areas with a high heat value) may be areas of the screen in which more distinct edges were detected.

According to at least one further embodiment, when identifying one or more active areas of the screen via the component tree analysis of existing windows and their respective interactive elements, AWP program 107 may additionally evaluate component tree information of one or more partially or completely hidden windows, and their respective interactive elements, as well as component tree information of one or more minimized windows. AWP program 107 may create multiple heat maps, based on multiple compiled lists of component coordinates for all windows, which may represent layers of the screen. For example, a first heat map may be created for topmost (e.g., fully visible) windows and their respective interactive elements. A second heat map may be created for bottommost windows (i.e., windows partially or completely hidden by the topmost windows) and their respective interactive elements. Further, a third heat map may be created for minimized windows of the screen. AWP program 107 may then overlay (i.e., combine) the created heat maps, and their respective heat values, to create a single heat map with potentially weighted heat values. For example, a single heat map with heat values of topmost windows weighted more heavily than heat values of bottommost windows and heat values of bottommost windows weighted more heavily than heat values of minimized windows.

According to at least one other embodiment, when identifying one or more active areas of the screen via the edge detection analysis of existing windows and their respective interactive elements, AWP program 107 may additionally perform edge detection analysis of one or more partially or completely hidden windows, and their respective interactive elements, as well as edge detection analysis of one or more minimized windows. AWP program 107 may create multiple heat maps, based on edge detection output from all windows, which may represent layers of the screen. For example, a first heat map may be created for topmost (e.g., fully visible) windows and their respective interactive elements. A second heat map may be created for bottommost windows (i.e., windows partially or completely hidden by the topmost windows) and their respective interactive elements. Further, a third heat map may be created for minimized windows of the screen. AWP program 107 may then overlay the created heat maps, and their respective heat values, to create a single heat map with potentially weighted heat values. For example, a single heat map with heat values of topmost windows weighted more heavily than heat values of bottommost windows and heat values of bottommost windows weighted more heavily than heat values of minimized windows.

Next, at 208, AWP program 107 utilizes one or more known search algorithms to evaluate the heat map created at 206 in order to identify a least active area of the computing device screen. According to at least one embodiment, the search algorithm utilized by AWP program 107 may include a search-based numerical method to solve for a minimum heat value of the heat map created at 206. Numerical methods may use a numerical approximation to solve for a solution (or near-enough solution) to a problem. As noted above, a high heat value may indicate an area of the screen with high activity, likewise, a minimum heat value may be indicative of an area of the screen with least activity. In an embodiment where multiple heat maps have been created and combined into a single heat map, AWP program 107 may weight heat values, as described above, when applying search algorithms to solve for a minimum heat value and accordingly identify an area of the screen with least activity. According to at least one other embodiment, rather than numerical methods, AWP program 107 may utilize other methods including discrete mathematics to solve for an exact solution (e.g., a brute force search).

At 210, AWP program 107 places (i.e., displays) the window within the identified area of the computing device screen with the least activity. In placing the window, AWP program 107 may reposition or resize the window so that its placement minimizes obscuring more active areas of the screen and therefore minimizes obscuring one or more other windows and their respective interactive elements. Alternatively, where AWP program 107 cannot place the window within the area of the screen with the least activity as a result of other constraints (e.g., a window needing to "stick" to the top of the screen), AWP program 107 may select an area of the computing device screen for placement of the window and display the window in such a manner as to minimize the heat value of other screen areas covered by the pixel area of the window.

At 212, AWP program 107 places (i.e., displays) the window on the computing device screen according to its intended screen placement and intended dimensions. AWP program 107 may reference the received attribute information associated with the application window for information such as default display location and pixel dimensions (e.g., height and width) of the window.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving a window opening event for an application window;

in response to determining that the application window can be repositioned and resized, identifying one or more active areas of a computing device screen, wherein an active area is an area of the computing device screen which is currently displaying one or more other windows;

creating a heat map representation of the one or more active areas of the computing device screen, wherein the heat map representation comprises heat values associated with the one or more active areas, and wherein a heat value associated with an active area correlates to a population density of existing windows displayed within the active area;

utilizing one or more search algorithms to identify a least active area of the one or more active areas of the computing device screen via application of a numerical method to solve for a minimum value of the heat map; and displaying the application window within the least active area.

2. The method of claim 1, wherein creating the heat map representation further comprises:

retrieving component and respective subcomponent information of windows, and their respective interactive elements, currently displayed and visible on the computing device screen;

compiling a list of retrieved component, and respective subcomponent, pixel coordinates; and creating the heat map based on the compiled list of retrieved component, and respective subcomponent, pixel coordinates, wherein a heat value of an area of the computing device screen is based on a number of components and subcomponents placed in the area.

3. The method of claim 1, wherein creating the heat map representation further comprises:

retrieving an image of a current layout of the computing device screen;

performing an edge detection analysis on the image to identify distinct edges of visible windows within the computing device screen; and creating the heat map based on output of the edge detection analysis, wherein a heat value of an area of the computing device screen is based on a number of distinct edges detected within in the area.

4. The method of claim 2, further comprising:

retrieving component and respective subcomponent information of hidden windows, and their respective interactive elements, currently displayed on the computing device screen;

compiling a second list of retrieved component, and respective subcomponent, pixel coordinates;

creating a second heat map based on the compiled second list of retrieved component, and respective subcomponent, pixel coordinates; and combining the heat map and the second heat map.

5. The method of claim 3, further comprising:

performing an edge detection analysis on the image to identify distinct edges of one or more partially or completely hidden windows within the computing device screen;

creating a second heat map based on output of the edge detection analysis; and combining the heat map and the second heat map.

6. The method of claim 1, further comprising:

in response to determining that the application window cannot be displayed within the least active area, selecting an area of the computing device screen for displaying the application window in a manner which minimizes respective heat values of the one or more active areas covered by a pixel area of the application window.

7. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a window opening event for an application window;

in response to determining that the application window can be repositioned and resized, identifying one or more active areas of a computing device screen, wherein an active area is an area of the computing device screen which is currently displaying one or more other windows;

creating a heat map representation of the one or more active areas of the computing device screen, wherein the heat map representation comprises heat values associated with the one or more active areas, and wherein a heat value associated with an active area correlates to a population density of existing windows displayed within the active area;

utilizing one or more search algorithms to identify a least active area of the one or more active areas of the computing device screen via application of a numerical method to solve for a minimum value of the heat map; and displaying the application window within the least active area.

8. The computer system of claim 7, wherein creating the heat map representation further comprises:

retrieving component and respective subcomponent information of windows, and their respective interactive elements, currently displayed and visible on the computing device screen;

compiling a list of retrieved component, and respective subcomponent, pixel coordinates; and creating the heat map based on the compiled list of retrieved component, and respective subcomponent, pixel coordinates, wherein a heat value of an area of the computing device screen is based on a number of components and subcomponents placed in the area.

9. The computer system of claim 7, wherein creating the heat map representation further comprises:

retrieving an image of a current layout of the computing device screen;

performing an edge detection analysis on the image to identify distinct edges of visible windows within the computing device screen; and creating the heat map based on output of the edge detection analysis, wherein a heat value of an area of the computing device screen is based on a number of distinct edges detected within in the area.

10. The computer system of claim 8, further comprising:

retrieving component and respective subcomponent information of hidden windows, and their respective interactive elements, currently displayed on the computing device screen;

compiling a second list of retrieved component, and respective subcomponent, pixel coordinates;

creating a second heat map based on the compiled second list of retrieved component, and respective subcomponent, pixel coordinates; and combining the heat map and the second heat map.

11. The computer system of claim 9, further comprising:

performing an edge detection analysis on the image to identify distinct edges of one or more partially or completely hidden windows within the computing device screen;

creating a second heat map based on output of the edge detection analysis; and
combining the heat map and the second heat map.

12. The computer system of claim 7, further comprising:
in response to determining that the application window cannot be displayed within the least active area, selecting an area of the computing device screen for displaying the application window in a manner which minimizes respective heat values of the one or more active areas covered by a pixel area of the application window.

13. A computer program product, the computer program product comprising:
one or more computer readable storage medium and program instructions stored on at least one of the one or more computer readable storage medium, the program instructions executable by a processor capable of performing a method, the method comprising:
receiving a window opening event for an application window;
in response to determining that the application window can be repositioned and resized, identifying one or more active areas of a computing device screen, wherein an active area is an area of the computing device screen which is currently displaying one or more other windows;
creating a heat map representation of the one or more active areas of the computing device screen, wherein the heat map representation comprises heat values associated with the one or more active areas, and wherein a heat value associated with an active area correlates to a population density of existing windows displayed within the active area;
utilizing one or more search algorithms to identify a least active area of the one or more active areas of the computing device screen via application of a numerical method to solve for a minimum value of the heat map; and
displaying the application window within the least active area.

14. The computer program product of claim 13, wherein creating the heat map representation further comprises:
retrieving component and respective subcomponent information of windows, and their respective interactive elements, currently displayed and visible on the computing device screen;
compiling a list of retrieved component, and respective subcomponent, pixel coordinates; and
creating the heat map based on the compiled list of retrieved component, and respective subcomponent, pixel coordinates, wherein a heat value of an area of the computing device screen is based on a number of components and subcomponents placed in the area.

15. The computer program product of claim 13, wherein creating the heat map representation further comprises:
retrieving an image of a current layout of the computing device screen;
performing an edge detection analysis on the image to identify distinct edges of visible windows within the computing device screen; and
creating the heat map based on output of the edge detection analysis, wherein a heat value of an area of the computing device screen is based on a number of distinct edges detected within in the area.

16. The computer program product of claim 14, further comprising:
retrieving component and respective subcomponent information of hidden windows, and their respective interactive elements, currently displayed on the computing device screen;
compiling a second list of retrieved component, and respective subcomponent, pixel coordinates;
creating a second heat map based on the compiled second list of retrieved component, and respective subcomponent, pixel coordinates; and
combining the heat map and the second heat map.

17. The computer program product of claim 15, further comprising:
performing an edge detection analysis on the image to identify distinct edges of one or more partially or completely hidden windows within the computing device screen;
creating a second heat map based on output of the edge detection analysis; and
combining the heat map and the second heat map.

* * * * *